Patented Apr. 24, 1934

1,955,864

UNITED STATES PATENT OFFICE 1,955,864

BEVERAGES AND BEVERAGE MATERIALS AND THE PREPARATION THEREOF

Jesse W. Stevens, Ontario, Calif., assignor to California Fruit Growers Exchange, Los Angeles, Calif., a corporation of California No Drawing. Application May 4, 1931, Serial No. 535,090

16 Claims. (Cl. 99—11)

This invention relates to beverages and beverage materials such as concentrated beverage preparations, and has particular reference to beverages prepared with fruit juices and similar materials. The invention also relates to a method of preparing beverages and beverage materials whereby the natural flavor and color of the fruit juices employed in such beverages is retained and maintained for protracted periods of time.

This invention has special applicability to the preparation of beverages and beverage concentrates or syrups from those fruit juices which are relatively high in acidity and low in natural buffers. Although the invention is applicable to a great variety of fruit juices, it has been developed, in its more specific form, in connection with citrus fruit juices and therefore for purposes of simplicity, the subsequent description will be confined largely to the preparation of beverages, syrups and beverage concentrates from citrus fruit juices.

As has been stated hereinbefore, the invention is particularly applicable to fruit juices which are relatively high in acidity, and for this reason, the preparation of lemon and lime beverages in accordance with this invention, will be described in detail.

It is to be understood, however, that the invention is not limited to beverages made from lemon or lime juices nor, indeed, to citrus fruit juices, as the invention may be used in the preparation of any fruit juice high in acidity and low in natural buffers.

In the preparation of beverages from fruit juices, the fruit juices are generally first concentrated so as to form a fruit juice concentrate. Subsequently, syrups are made from the fruit juice concentrates by merely adding a suitable quantity of sugar and water thereto. Such fruit juice syrups are then used in the preparation of beverages.

Fruit juice beverages may be divided into two broad classes—still drinks and carbonated drinks. The former consist essentially of prepared fruit syrups which are mixed with plain water. The latter usually consist of identical or similar syrups which are mixed with more or less strongly carbonated water. Either type of beverage may be dispensed, either in bottles (which are filled at some central plant and distributed as needed) or prepared individually and dispensed in glasses or other suitable containers. Beverages of this type are obviously not pure fruit juices, although ordinarily they contain from about 5% to about 25% of fruit juice.

It is to be understood that not all beverages need be made by first making a fruit juice concentrate, then a syrup, and finally the beverage. Instead, the fruit juice concentrate may be mixed directly with water, or the steps of making the fruit juice concentrate and the syrup may be combined, or a syrup may be prepared directly from the fruit juice. In all instances, however, the final beverage consists of a more concentrated form of fruit juice diluted with a proper proportion of either still or carbonated water.

With all ordinary procedures, there are some fruit juices which can not be included in the final beverage in desirably large quantities because they would impart to such beverage too much of some particular characteristic. Thus, some high acid fruit juices have had to be used in comparatively small quantities so that the beverage may not be made too tart. Lemon juice is ordinarily subject to this disadvantage and heretofore sugars had to be added in undue quantities to lemon beverages in order to mask the high acidity. But as a result of such addition of sugar, the flavor is impaired. Lemon juice is also subject to the disadvantage that beverages prepared therefrom are decidedly unstable as to flavor, as the characteristic and delicate lemon flavor quickly deteriorates and is lost.

It has been discovered that these and other disadvantages may be overcome and various highly desirable advantages achieved by the utilization of one or more of certain materials in the preparation of beverages and beverage concentrates or syrups, which materials will be referred to hereinafter as buffering materials. Buffering materials may consist of manufactured substances of a suitable nature and sufficient purity, or of naturally occurring materials such as a highly buffered fruit or plant juice. In some instances, a combination of manufactured materials and natural materials will prove most desirable.

Illustrative of some of the desirable effects attained by employing a buffering material, attention may be called to the following:

Concentrated lemon juice darkens very appreciably upon standing, changing in color from its original shade of yellow to a tan or light brown, and finally to a very decided brown. Such darkening, of course, impairs and eventually destroys the salability of the concentrated lemon juice or beverages made therefrom. By employing a buffering material in the concentrated lemon juice, the darkening is retarded to an astonishing extent while the delicate original flavor and aroma are retained and stabilized for the beverage to be prepared therefrom.

As a matter of fact, it has been discovered that by employing suitable buffers, an improved "body" is imparted to the beverage, the beverage being rich in lemon character and capable of giving a lasting taste impression or prolonging the taste impression. This prolongation of taste impression is of great commercial value, and such result can not be obtained, to my knowledge, in any other way than that disclosed herein. This result, namely, the development of a desirable body or lasting and characteristic taste impression, is attained not only by the use of a buffer in beverages containing large amounts of fruit juice (such as beverages which might be too tart without the buffer), but also in beverages of a small fruit juice content (which beverages without the buffer would be lacking in body or taste impression).

In the manufacture of concentrated lemon juice and beverage materials and beverages therefrom, it has been found that excellent results are achieved by the use of orange juice, apricot juice or peach juice as a natural buffering material, or by the use of a manufactured buffering material such as a suitable alkali salt of a fruit acid such as, for example, sodium citrate.

It is therefore an object of this invention to disclose and provide a method of buffering fruit juices whereby the desirable qualities thereof may be improved and/or retained.

Another object of this invention is to disclose and provide a method of improving the palatability of beverages and of imparting a desirable body to fruit juice beverages.

Another object is to disclose and provide a method for improving the flavor and keeping qualities of fruit juice products, particularly products made from fruit juices which are high in natural acid content.

Still another object is to disclose and provide means and methods of handling fruit juices high in natural acid so that they may be employed in beverages in increased proportions.

Another object is to disclose and provide a method of developing a desirable and lasting taste impression or body in citrus fruit beverages containing relatively small amounts of citrus fruit juice.

A still further object of this invention is to disclose and provide a method of treating or buffering fruit juice products with other fruit juice material or with materials closely related to substances occurring naturally in the fruit juice being treated, whereby the characteristic flavor and color of the fruit juice may be stabilized.

Another object of this invention is to disclose and provide beverages and beverage concentrates of fruit juices high in natural acid which are stable as to color and flavor.

These and other objects, uses, advantages and characteristics of this invention will be in part obvious and in part will appear from a contemplation of the invention as set forth herein and in the appended claims.

As has been stated briefly hereinbefore, this invention contemplates using either natural or manufactured buffers in fruit juice beverages. With lemon juice, for example, an orange juice material and/or sodium citrate may be employed, although either or both of these buffers may be replaced wholly or in part by other material or materials, care being taken not to introduce any distinctly foreign or undesirable flavors. Orange juice in small amounts will not introduce any distinctly foreign or undesirable flavors into a lemon juice product, probably because of the fact that the two fruits are closely related. Sodium potassium or other soluble and suitable citrate will also not add any foreign substance to the lemon or other citrus juice products and with lemon juice, it has been found that the use of sodium citrate imparts a clean, distinct and pleasing lemon flavor to the beverage.

Some buffering materials, due to their nature or the nature of their components, may not be edible and some may have extensive deleterious effects upon the constituents of the fruit juice which it is desired to treat. All such buffering materials as exert a deleterious effect are obviously not useful for the purposes of this invention and are not intended to be included thereby. Furthermore, those buffering materials which have of themselves or produce in the beverage an undesirable flavor, should not be employed.

In general, by the term "buffering material" or "buffer", reference is made to those substances which when introduced into a product made with a fruit juice high in acid, will decrease the active acidity of the product (increase the pH value of the product) without materially decreasing or changing the titrable acidity. It should be distinctly understood, however, that whenever reference is made to the use, employment or addition of a buffer, the invention also contemplates that desirable results may be achieved by forming a buffering material directly in the product. With lemon juice, for example, sodium citrate may be formed therein by introducing into the juice suitable amounts of sodium hydroxide, sodium carbonate, sodium bicarbonate, or the like.

In order to make this invention fully understood to those skilled in the art, the application thereof to the manufacture of a concentrated lemon juice beverage base and a carbonated lemon beverage therefrom, will be described in detail. Methods of concentrating lemon juice are well known and need not be described. In general, however, concentrated lemon juice suitable for subsequent use in beverages, may contain from about 7% to 30% by weight of anhydrous citric acid. A small quantity of sodium benzoate may be added to the concentrated lemon juice as a preservative. It has been found that about 0.5%–2.25% of sodium benzoate is sufficient.

The buffering material may consist of orange juice, and if orange juice is employed as the buffering agent, such orange juice is preferably also in concentrated form. From 5 to 40% by weight of the total beverage concentrate may consist of orange juice without any serious impairment of the lemon character of the flavor. For ordinary purposes, however, from 5 to 20% of concentrated orange juice is sufficient.

When a manufactured material, such as sodium citrate, is used as the buffer, from about 0.2% to about 5% of sodium citrate by weight may be present in the lemon juice beverage concentrate. In lemon juice products, the desirable ratio between naturally occurring citric acid and added sodium citrate, appears to lie in a range of from about 0.04 to about 0.19 parts of sodium citrate to 1 part of anhydrous citric acid. It is to be kept in mind that wherever reference is made herein to a definite quantity of sodium citrate, the quantity equivalent to that amount of the crystalline material $2Na_3C_6H_5O_7.11H_2O$ is meant.

The lemon juice beverage concentrate may contain in addition to concentrated lemon juice, a buffer, and a preservative, small quantities of lemon oil and sugar. Beverages may be made from such beverage concentrate by the addition of a sugar syrup thereto and water. For ordinary purposes, however, a syrup is first made by adding water and sugar or a sugar syrup to the beverage concentrate.

Ordinarily, from about 5 to 9 parts of sugar syrup are added to 1 part of the beverage concentrate in order to make a syrup therefrom, so that the syrup contains from about 0.9% to about 2.5% of anhydrous citric acid. Actual beverages may then be made from the lemon juice syrup by mixing the syrup with either still or carbonated water. The final beverage generally contains from about 0.1% to about 1.7% of anhydrous citric acid and from about 0.015% to about 0.07% of sodium citrate (when this is used as the buffer). The sodium benzoate may be present in the final beverage in amounts of about 0.03% without imparting sufficient characteristic flavor to the beverage to be objectionable or even noticeable to an ordinary consumer. The pH of a finished beverage of the type described will preferably lie between about pH 2.90 and pH 3.15; pH 3.0 being about the optimum. Whenever reference is made to pH herein it is to be understood that the reference is made to values obtained by measurements made after carbon dioxide, if any, has been removed from the product.

Instead of employing either a natural buffer, such as orange juice, or a manufactured buffer, such as sodium citrate, alone, a mixture of the two may be used. It has been found, for example, that very desirable results may be obtained by using about 5% of orange juice in addition to the citrate buffer. The orange juice may be fresh or from a concentrate and where its insoluble solids are not desired in the final product, it may be filtered or clarified.

Where a buffering material is formed by neutralization of a part of the naturally occurring acid of the fruit juice, a balance or ratio between the acid and the buffering material similar to that stated hereinbefore is desirable. For example, an excellent lemon concentrate containing approximately 25% of anhydrous citric acid may be produced by neutralizing 6% of the original acid present with NaOH during concentration. Where it is desired not to reduce the total titrable acid, addition of the buffer rather than its formation in the product is to be desired. As an illustrative example of one of the products which may be made in accordance with this invention, an excellent lemon juice concentrate for beverage purposes may be made, such beverage concentrate containing 15.3% by weight of anhydrous citric acid, 1.24% by weight of sodium citrate, and 1.2% of sodium benzoate. Such a beverage concentrate may contain also 2.3% of concentrated orange juice. The final beverages made from such concentrate contain about 7% by weight of lemon juice.

Benzoate of soda, mentioned hereinabove and used as a preservative, has some tendency to increase the pH of a beverage product, but it is to be understood that sodium benzoate is employed merely for its preservative action and is not to be regarded as a suitable buffering material since, when it is introduced in amounts sufficient to increase the pH to the point which is considered desirable, it produces a distinct and undesirable characteristic benzoate flavor in the beverage.

When less than 0.03% of sodium benzoate is used in the final beverage, however, it is satisfactory from a preservative standpoint and does not impart a distinct and undesirable characteristic flavor in the beverage.

While the preparation of a particular type of lemon beverage has been described in detail hereinabove, it is to be understood that the principle involved applies to other forms of lemon products as well as to various forms of products prepared with other fruit juices which are high in naturally occurring acid. The invention is not only applicable to beverages composed essentially of true fruit juices but may also be used with advantage on beverages composed partly of true fruit juices and partly of synthetic flavoring, coloring, etc.

Those skilled in the art will appreciate the importance of this invention and the numerous changes and modifications which may be made in applying the invention to the art.

All such changes and modifications as come within the scope of the appended claims are embraced thereby.

I claim:

1. A citrus juice beverage concentrate characterized by stability of color and flavor, containing concentrated lemon juice and an added buffer of sodium citrate.

2. A citrus juice beverage concentrate characterized by stability of color and flavor, consisting essentially of concentrated lemon juice containing citric acid and an added buffer of sodium citrate, the beverage concentrate containing from about 5% to 30% by weight of anhydrous citric acid and from about 0.2% to 5% of sodium citrate.

3. A citrus juice beverage concentrate characterized by stability of color and flavor, and consisting of 60% to 95% of concentrated lemon juice and from about 5% to 40% by weight of concentrated orange juice whereby the color and flavor of the beverage are stabilized.

4. A citrus juice beverage concentrate consisting essentially of concentrated lemon juice and a buffer of sodium citrate in the proportion of about 0.04 parts to 0.19 parts of sodium citrate to 1 part of anhydrous citric acid.

5. A citrus beverage concentrate relatively high in naturally occurring acid and low in naturally occurring buffers, containing an added buffer whose basic component is ionizable more strongly than the acid component of said concentrate, said added buffer being adapted to increase the pH of the concentrate without decreasing titrable acidity of the concentrate.

6. A citrus beverage concentrate relatively high in naturally occurring acid and low in naturally occurring buffers, containing an added buffer whose basic component is ionizable more strongly than the acid component of said concentrate, said added buffer being adapted to increase the pH of the concentrate without decreasing titrable acidity of the concentrate, said added buffer being present in quantity sufficient to stabilize the color and flavor of the citrus beverage concentrate.

7. A citrus juice beverage concentrate consisting essentially of concentrated lemon juice containing citric acid, and an added buffer of sodium citrate and concentrated orange juice, the beverage concentrate containing between about 0.04 parts and 0.19 parts of sodium citrate to 1 part of anhydrous citric acid.

8. A citrus juice beverage syrup consisting essentially of concentrated lemon juice and a sugar syrup, and containing an added buffer adapted to increase the pH of the beverage syrup without materially changing the titrable acidity thereof, said added buffer being present in quantity sufficient to stabilize the flavor and color of such beverage syrup.

9. A citrus fruit juice beverage having a pH of between about 2.9 and 3.15 and containing from about 0.1% to about 1.7% of anhydrous citric acid and an added buffer adapted to increase the pH of the beverage without decreasing the titrable acidity thereof, said added buffer being present in quantity sufficient to stabilize the flavor and color of the beverage and impart a desirable body thereto.

10. A lemon juice beverage containing a small quantity of concentrated lemon juice, water and sugar, said beverage containing an added buffer of sodium citrate present in the proportion of 0.04 to 0.19 parts of sodium citrate to 1 part of anhydrous citric acid.

11. A citrus fruit beverage concentrate characterized by stability of color and flavor, consisting essentially of concentrated citrus fruit juice containing citric acid and an added buffer of sodium citrate, said beverage concentrate containing from about 5% to 30% by weight of anhydrous citric acid and from about 0.2% to 5% by weight of sodium citrate, said beverage concentrate also containing not more than about 1.25% sodium benzoate.

12. A citrus beverage consisting essentially of water, concentrated citrus fruit juice, sugar syrup sodium citrate and sodium benzoate, said beverage containing not more than about 0.03% of sodium benzoate and from about 0.015% to 0.07% of sodium citrate.

13. A citrus juice beverage characterized by stability of color and flavor, containing lemon juice and an added buffer of sodium citrate.

14. A lemon juice beverage having a pH of between about 2.9 and 3.15 and containing from about 0.1% to about 1.7% of anhydrous citric acid and an added buffer adapted to increase the pH of the beverage without decreasing the titrable acidity thereof, said added buffer being present in quantity sufficient to stabilize the flavor and color of the beverage and impart a desirable body thereto.

15. A citrus fruit juice beverage syrup consisting essentially of concentrated citrus fruit juice and a sugar syrup, said beverage syrup containing an added fruit juice as a buffer adapted to increase the pH of the beverage syrup without materially changing the titrable acidity thereof, said added buffer being present in quantities sufficient to stabilize the flavor and color of such beverage syrup.

16. A fruit juice beverage product consisting essentially of fruit juice relatively high in natural acid and relatively low in natural buffers, and a sugar syrup, said beverage product containing an added buffer adapted to increase the pH of the beverage product without materially changing the titrable acidity thereof, said added buffer being present in quantities sufficient to stabilize the flavor and color of the beverage product.

JESSE W. STEVENS.